(12) United States Patent
Resnick et al.

(10) Patent No.: US 6,864,000 B2
(45) Date of Patent: Mar. 8, 2005

(54) SHUTDOWN PROCEDURE TO IMPROVE STARTUP AT SUB-FREEZING TEMPERATURES

(75) Inventors: Gennady Resnick, S. Windsor, CT (US); Carl A. Reiser, Stonington, CT (US)

(73) Assignee: UTC Fuel Cells, LLC, South Windsor, CT (US)

( * ) Notice: Subject to any disclaimer, the term of this patent is extended or adjusted under 35 U.S.C. 154(b) by 2 days.

(21) Appl. No.: 10/186,501

(22) Filed: Jun. 28, 2002

(65) Prior Publication Data

US 2004/0001981 A1 Jan. 1, 2004

(51) Int. Cl.$^7$ .............................. H01M 8/00; H01M 8/12
(52) U.S. Cl. ............................. 429/13; 429/24; 429/25; 429/26
(58) Field of Search .............................. 429/13, 20, 25, 429/24, 26, 22

(56) References Cited

U.S. PATENT DOCUMENTS

| | | | |
|---|---|---|---|
| 4,040,435 A | 8/1977 | Elzinga | |
| 4,965,143 A | 10/1990 | Mizuno et al. | |
| 5,149,599 A | 9/1992 | Kamoshita | |
| 5,154,986 A | * 10/1992 | Takechi et al. | ............... 429/23 |
| 6,120,925 A | 9/2000 | Kawatsu et al. | |
| 2002/0009623 A1 | 1/2002 | St. Pierre et al. | |

* cited by examiner

*Primary Examiner*—Raymond Alejandro
(74) *Attorney, Agent, or Firm*—Bachman & LaPointe, PC

(57) ABSTRACT

A method for shutting down a fuel cell system including a plurality of fuel cells arranged in a stack, includes cooling the fuel cells to a shutdown temperature while maintaining a substantially uniform water vapor pressure through the fuel cells whereby migration of water within the fuel cells during cooling is reduced.

15 Claims, 1 Drawing Sheet

US 6,864,000 B2

SHUTDOWN PROCEDURE TO IMPROVE STARTUP AT SUB-FREEZING TEMPERATURES

BACKGROUND OF THE INVENTION

The present invention relates to fuel cells and, more particularly, to a method for shutting down a fuel cell which improves startup after exposure to sub-freezing conditions.

Electrochemical fuel cell assemblies are known for their ability to produce electricity and a subsequent reaction product through the reaction of a fuel being provided to an anode and an oxidant being provided to a cathode, thereby generating a potential between these electrodes. Such fuel cell assemblies are very useful and sought after due to their high efficiency, particularly as compared to internal combustion fuel systems and the like. Fuel cell assemblies are additionally advantageous due to the environmentally friendly chemical reaction byproducts that are produced, such as water. In order to control the temperature within the fuel cell assembly, a coolant is provided to the fuel cell assembly, and this coolant may also typically be water. Thus, water circulates through the fuel cell assembly during operation of same.

One particularly attractive use for fuel cell assemblies is in vehicular applications. However, a critical problem in connection with such use is the sensitivity of the fuel cell assembly to sub-freezing temperatures, and the water circulating through a fuel cell assembly is particularly susceptible to freezing in the fuel cell and creating serious problems for subsequent startup.

A number of solutions to this problem have been attempted, mostly including methods for removing water from the fuel cell assembly before such water reaches a freezing temperature. Despite these efforts, the need remains for an efficient and effective shutdown method which allows for rapid startup after sub-freezing conditions, without substantially increasing the size, cost or startup time of the fuel cell.

It is therefore the primary object of the present invention to provide an improved shutdown method which meets these requirements.

SUMMARY OF THE INVENTION

In accordance with the present invention, the foregoing objects and advantages have been readily attained.

In accordance with the present invention, a method is provided for shutting down a fuel cell system comprising a plurality of fuel cells arranged in a stack, which method comprises cooling said fuel cells to a shutdown temperature while maintaining a substantially uniform water vapor pressure through said fuel cells whereby migration of water within said fuel cells during said cooling is reduced.

In accordance with the invention, the step of maintaining substantially uniform water vapor pressure through the fuel cells during the cooling step may be accomplished by several alternative methods, including insulating end portions of the fuel cell system, heating end portions of the fuel cell system, flowing air through the fuel cell system during cooling, positively cooling the fuel cell system with circulating coolant or air flow therethrough, and the like. These are all alternative methods for accomplishing the desired objective, which is to maintain a substantially uniform water vapor pressure through the fuel cells of the fuel cell assembly during the cooling steps such that migration of water is reduced if not eliminated, thereby preventing build up of water in fuel cell components adjacent the end plates of the fuel cell assembly.

BRIEF DESCRIPTION OF THE DRAWINGS

A detailed description of preferred embodiments of the present invention follows, with reference to the attached drawing, wherein.

DETAILED DESCRIPTION

Figure 1:
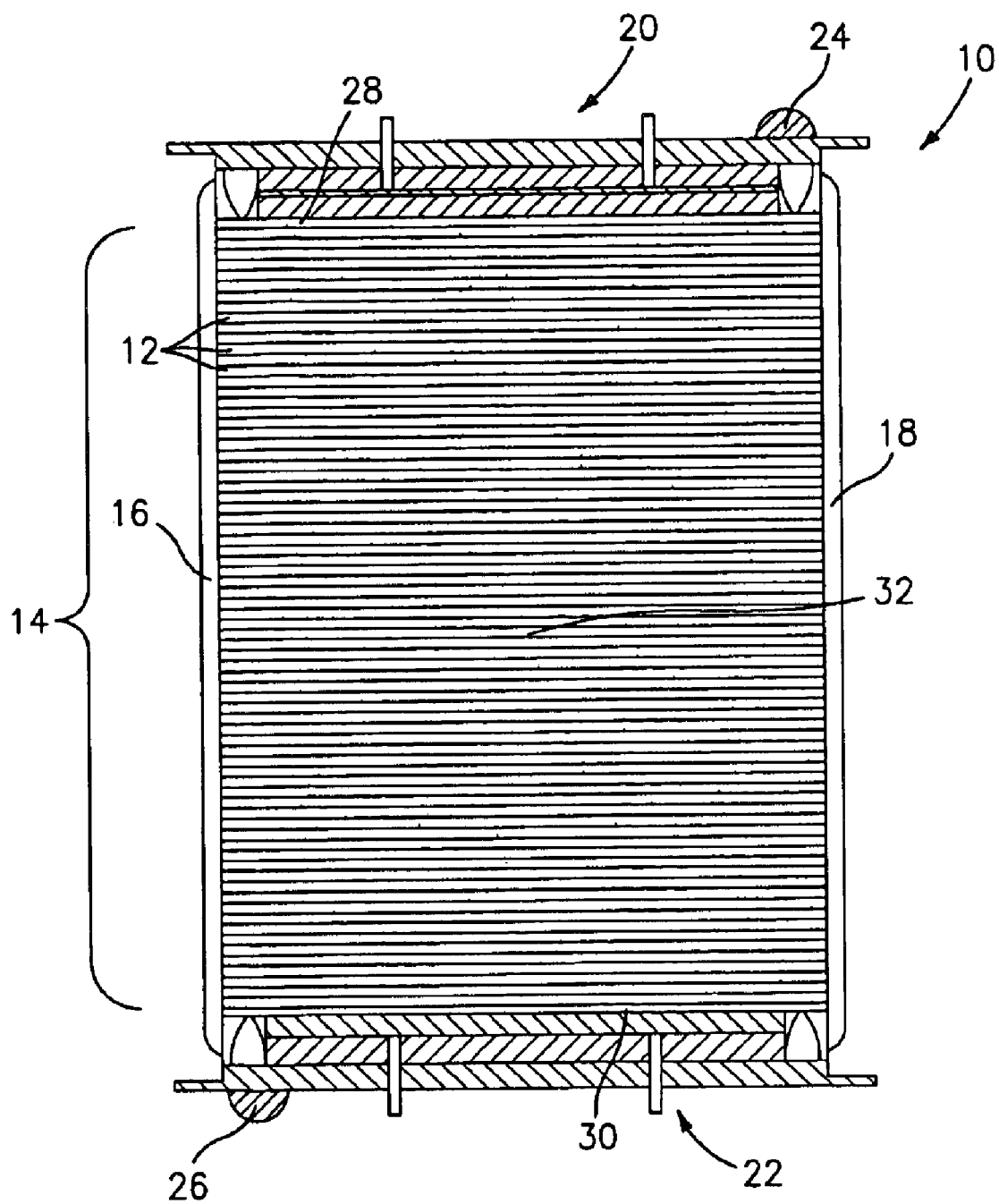
FIG. 1 schematically illustrates a fuel cell assembly in connection with the method of the present invention.

The invention relates to fuel cells and, more particularly, to a method for shutting down a fuel cell system in anticipation of sub-freezing temperatures which provides for improved startup after being subjected to such sub-freezing temperatures.

FIG. 1 shows a schematic, cross-sectional representation of a fuel cell stack 10 of a fuel cell system which can be operated in accordance with the method of the present invention.

Fuel cell stack 10 includes a plurality of fuel cell component plates 12 which define a reaction portion 14 of fuel cell stack 10. As is well known to a person of ordinary skill in the art, fuel cell component plates 12 include plate-shaped components making up individual fuel cells, and include components such as anode and cathode electrodes on opposite sides of electrolytes, such as PEM electrolytes, along with coolant plates which may be disposed between fuel cells to maintain an optimal temperature of fuel cell stack 10.

FIG. 1 also shows fuel cell stack 10 having manifolds 16, 18 positioned along sides thereof for conveying reactant and oxidant to the various fuel cell component plates as desired and as is well known. In addition, FIG. 1 shows fuel cell stack 10 including end assemblies 20, 22 such as pressure plates, seal gaskets and the like.

In operation, reactant and oxidant are fed to fuel cell stack 10 through manifolds 16, 18 so as to generate desired electricity, and also, as a byproduct, water. As stated above, fuel cell stack 10 must be cooled, and coolant headers 24, 26 and other such structure are advantageously provided to feed coolant through fuel cell stack 10 as desired. Coolant is typically water.

In accordance with the present invention, during operation, it should be readily apparent that water is present in the various fuel cell component plates 12. When fuel cell stack 10 is shut down and subjected to sub-freezing temperatures, this water can freeze, thereby causing significant difficulties in restarting the fuel cell stack as desired.

In accordance with the present invention, it has been found that such difficulties are most problematic due to the excess water freezing in end cells 28, 30 which interfere with normal bootstrap startup operations, and that water tends to migrate toward end cells 28, 30 when fuel cell stack 10 cools. This is due to the fact that manifolds 16, 18 are poor thermal conductors, and therefore that cooling takes place most rapidly at end cells 28, 30. Thus, vapor partial pressure is highest at a center region 32 of fuel cell stack 10, and lowest at cooler end cells 28, 30. This results in migration of water toward end cells 28, 30, where such water freezes when freezing temperatures are reached, thereby causing substantial difficulties. It is therefore the thrust of the present invention to prevent such migration during cooling.

In accordance with the present invention, the fuel cell stack is shut down in a way which minimizes migration of water to end cells 28, 30, at least until a temperature is reached wherein water ceases to migrate in an appreciable amount, by maintaining the water vapor pressure substantially constant throughout fuel cell stack 10 during cooling.

By maintaining vapor partial pressure substantially uniform in accordance with the present invention, water advantageously does not migrate toward end cells 28, 30, and rather freezes in the plates where it is located, and in substantially uniform amounts throughout fuel cell stack 10. These amounts are not sufficient to cause substantial difficulty during startup, and therefore the method of the present invention provides for greatly facilitated startup after exposure of fuel cell stack 10 to sub-freezing conditions.

The subject matter of the present invention is based upon the discovery that manifolds 16, 18 are relatively poor thermal conductors, while structures adjacent to end cells 28, 30 such as pressure plates and the like, serve as better thermal conductors. Due to this, cooling occurs most rapidly in the area of end cells 28, 30, causing a differential in water vapor pressure which drives migration toward end cells 28, 30.

In accordance with the present invention, the water vapor pressure over fuel cell stack 10 is advantageously maintained substantially constant. This may be accomplished by insulating the end regions of fuel cell stack 10 so as to provide for more uniform cooling of fuel cell stack 10 as desired. Alternatively, in accordance with the present invention, regions of the end cells 28, 30 can be heated during cooling so as to provide for substantially uniform cooling. In addition, substantially uniform water vapor pressure can be maintained through cooling by flowing air through fuel cell stack 10 during cooling, which flow of air tends to cool fuel cell stack 10 at a substantially uniform rate.

In accordance with the present invention, it has been found that vapor pressure is most readily maintained substantially constant during cooling by maintaining a temperature differential between end cells 28, 30 and central region 32 at a differential of less than or equal to about 3° C., more preferably less than or equal to about 1° C. As noted above, by maintaining temperature differential at a minimum, water vapor pressure throughout fuel cell stack 10 will remain substantially constant, and water will not appreciably migrate.

In accordance with the present invention, the water vapor pressure maintenance is carried out until fuel cell stack 10 reaches a temperature below which water migration is not appreciable. As is well known, water freezes at a temperature of 0° C. (32° F.). In order to be certain that water migration will not take place, it may be desirable to maintain the water vapor pressure constant until fuel cell stack 10 reaches a shutdown temperature of less than about 10° C., more preferably less than about 5° C. and ideally less than about 0° C. By maintaining water vapor pressure substantially constant through cooling until a suitable shutdown temperature is reached, even a temperature above the freezing temperature of water, wherein the shutdown temperature is nevertheless sufficiently close to water freezing temperature as identified above, only insignificant migration of water will occur.

In accordance with one aspect of the present invention, temperature differential between end cells 28, 30 and center region 32 can be minimized by insulating end cells 28, 30 from end structures which are good thermal conductors, such as pressure plates and the like. This insulation can take many forms, such as mechanical spacers, interposed layers of poorly thermally conductive material, and the like.

In accordance with an alternative aspect of the present invention, air may be passed through fuel cell stack 10 during cooling, for example through one or both manifolds 16, 18, to provide for substantially uniform cooling of fuel cell stack 10 as desired.

Still further, in accordance with the present invention, heat can be applied to end cells 28, 30, for example using conventional heating equipment, most preferably heating equipment which is compact whereby fuel cell stack 10 remains as small as possible, and whereby heat supplied to end cells 28, 30 is maintained sufficient to provide for substantially uniform cooling of fuel cell stack 10 as desired.

Cooling can be allowed at a rate driven by surrounding conditions, or can be driven for example by flowing a coolant such as ambient air through fuel cell component plates 12. When allowed to cool, a substantially uniform cooling rate of between about 0.5 and about 1.0° C. per hour can be expected, while positive cooling can provide for a substantially uniform cooling rate of at least about 7° C. per hour.

In accordance with the present invention, by maintaining water vapor pressure substantially uniform using any one or more methods discussed above, water migration is prevented or at least reduced to the point where unacceptable concentrations of water do not freeze in end cells 28, 30, and some flow can therefore immediately be established during startup from a frozen condition.

This provides for substantial and advantageous improvements over conventional methods, which focus on removal of all water prior to reaching any freezing conditions. These efforts to remove water are costly and inefficient, and are shown by the present invention to be unnecessary.

It is to be understood that the invention is not limited to the illustrations described and shown herein, which are deemed to be merely illustrative of the best modes of carrying out the invention, and which are susceptible of modification of form, size, arrangement of parts and details of operation. The invention rather is intended to encompass all such modifications which are within its spirit and scope as defined by the claims.

What is claimed:

1. A method for shutting down a fuel cell system comprising a plurality of fuel cells arranged in a stack, comprising cooling said fuel cells to a shutdown temperature while maintaining a substantially uniform water vapor pressure through said fuel cells whereby migration of water within said fuel cells during said cooling is reduced.

2. The method of claim 1, wherein said shutdown temperature is less than or equal to about 10° C.

3. The method of claim 1, wherein said shutdown temperature is less than or equal to about 5° C.

4. The method of claim 1, wherein said shutdown temperature is less than or equal to about 0° C.

5. The method of claim 1, wherein said maintaining step comprises maintaining a temperature differential between cells of said stack at less than or equal to about 3° C. during said cooling step.

6. The method of claim 1, wherein said maintaining step comprises maintaining a temperature differential between cells of said stack at less than or equal to about 1° C. during said cooling step.

7. The method of claim 1, wherein said maintaining step comprises thermally insulating portions of said fuel cell system.

8. The method of claim 1, wherein said maintaining step comprises flowing air through said fuel cell during said cooling step so as to maintain said substantially uniform water vapor pressure.

9. The method of claim 1, wherein said maintaining step comprises flowing coolant through said fuel cell during said cooling step so as to maintain said substantially uniform water vapor pressure.

10. The method of claim 1, wherein said plurality of fuel cells comprises a series of fuel cells including two end cells, and wherein said maintaining step comprises providing heat to said end cells whereby said vapor pressure is maintained substantially uniform.

11. The method of claim 10, wherein said step of providing heat comprises providing heat sufficient to maintain a temperature differential between said end cells and cells positioned therebetween at less than or equal to about 3° C.

12. The method of claim 10, wherein said step of providing heat comprises providing heat sufficient to maintain a temperature differential between said end cells and cells positioned therebetween at less than or equal to about 1° C.

13. The method of claim 1, wherein said cooling step is carried out at a cooling rate of about 0.5–1° C. per hour.

14. The method of claim 1, wherein said cooling step comprises positively cooling said fuel cells at a cooling rate of at least about 7° C. per hour.

15. A method for shutting down a fuel cell system comprising a plurality of fuel cells arranged in a stack, comprising the steps of:

operating said fuel cell system so as to generate water in said fuel cells at a water vapor pressure;

cooling said fuel cells to a shutdown temperature; and maintaining a substantially uniform water vapor pressure through said fuel cells during said cooling step whereby migration of water within said fuel cells during said cooling step is reduced.

* * * * *